US011597600B2

(12) United States Patent
Zhang

(10) Patent No.: US 11,597,600 B2
(45) Date of Patent: Mar. 7, 2023

(54) ARTICLE PICKING METHOD, SERVER AND SYSTEM

(71) Applicant: BEIJING JINGDONG ZHENSHI INFORMATION TECHNOLOGY CO., LTD., Beijing (CN)

(72) Inventor: Shumin Zhang, Beijing (CN)

(73) Assignee: BEIJING JINGDONG ZHENSHI INFORMATION TECHNOLOGY CO., LTD., Beijing (CN)

( * ) Notice: Subject to any disclaimer, the term of this patent is extended or adjusted under 35 U.S.C. 154(b) by 287 days.

(21) Appl. No.: 16/767,052

(22) PCT Filed: Apr. 13, 2018

(86) PCT No.: PCT/CN2018/082974
§ 371 (c)(1),
(2) Date: May 26, 2020

(87) PCT Pub. No.: WO2019/100644
PCT Pub. Date: May 31, 2019

(65) Prior Publication Data
US 2020/0299063 A1    Sep. 24, 2020

(30) Foreign Application Priority Data

Nov. 27, 2017    (CN) .......................... 201711202487.1

(51) Int. Cl.
*G06F 7/00*    (2006.01)
*B65G 1/137*    (2006.01)
(Continued)

(52) U.S. Cl.
CPC ......... *B65G 1/1378* (2013.01); *B65G 1/0492* (2013.01); *G05B 19/4155* (2013.01); *G06Q 10/087* (2013.01); *G05B 2219/50391* (2013.01)

(58) Field of Classification Search
CPC    B65G 1/1378; B65G 1/0492; G05B 19/4155; G05B 2219/50391; G06Q 10/087; G06Q 10/08
(Continued)

(56) References Cited

U.S. PATENT DOCUMENTS 4,035,904 A    7/1977    Ishizaka et al.
5,238,349 A    8/1993    Grace, Sr.
(Continued)

FOREIGN PATENT DOCUMENTS

CN    101968860 A    2/2011
CN    204515844 U    7/2015
(Continued)

OTHER PUBLICATIONS

International Search Report dated Sep. 3, 2018 in PCT/CN2018,082974 filed on Apr. 13, 2018, 2 pages.

*Primary Examiner* — Yolanda R Cumbess
(74) *Attorney, Agent, or Firm* — Oblon, McClelland, Maier & Neustadt, L.L.P.

(57) ABSTRACT

The present disclosure provides an article picking method, server and system, and relates to the field of smart storage technology. The article picking method according to the present disclosure includes: determining an order picking position for an order to be picked for according to one or more articles required in the order to be picked for; selecting one or more shelves carrying one or more of the articles required in the order to be picked for according to information of one or more articles on candidate shelves and distances from the shelves to the order picking position; and driving one or more selected shelves to the order picking position to perform article picking.

17 Claims, 8 Drawing Sheets

(51) Int. Cl.
  *B65G 1/04*      (2006.01)
  *G05B 19/4155*   (2006.01)
  *G06Q 10/087*    (2023.01)

(58) Field of Classification Search
  USPC .................................. 700/213–214, 216, 228
  See application file for complete search history.

(56)              References Cited

U.S. PATENT DOCUMENTS 10,026,044 B1 *   7/2018  Wurman ................ G06Q 10/08
  2012/0215344 A1   8/2012  Battles et al.
  2018/0039282 A1 * 2/2018  Gupta .................. G06Q 10/087
  2019/0039830 A1 * 2/2019  Wang ................... G06Q 10/087

FOREIGN PATENT DOCUMENTS

CN        105858045 A      8/2016
  CN        106185152 A     12/2016
  CN        106897852 A      6/2017
  CN        106960301 A      7/2017
  CN        107025533 A      8/2017
  CN        107256469 A     10/2017

\* cited by examiner

ARTICLE PICKING METHOD, SERVER AND SYSTEM

CROSS-REFERENCE TO RELATED APPLICATIONS

The present disclosure is a U.S. National Stage Application under 35 U.S.C. § 371 of International Patent Application No. PCT/CN2018/082974, filed on Apr. 13, 2018, which is based on and claims the benefit of priority to the Chinese patent application No. 201711202487.1 filed on Nov. 27, 2017, the disclosure of both of which are hereby incorporated by reference in its entirety into the present application.

TECHNICAL FIELD

The present disclosure relates to the field of smart storage technology, and in particular, to an article picking method, server and system.

BACKGROUND

In traditional warehousing technology, when an article in an order is being picked, an operator needs to look for shelves and find the article according to a system prompt, and then pick a corresponding article off from a shelf and put into a corresponding container in a manual handling manner. Since a mass of products are stored in an e-commerce warehouse, and orders at a million-level are processed daily, it results in a long walking path and a high labor intensity and a low operation efficiency of an operator.

In addition, since orders are mostly picked in a manual method in traditional warehouses, the orders will be uniformly processed when accumulated to a certain amount. Thus, it leads to a certain delay in order processing, and the picking efficiency is reduced. Moreover, mistakes are likely to be made when manual operation is affected by a degree of fatigue, and moreover, the checking process further wastes the labor and reduces the efficiency.

SUMMARY

According to some embodiments of the present disclosure, an article picking method is provided, comprising: determining an order picking position for an order to be picked for according to one or more articles required by the order to be picked for; selecting one or more shelves carrying one or more of the articles required by the order to be picked for according to information of one or more articles on candidate shelves and distances from the shelves to the order picking position; and driving one or more selected shelves to the order picking position to perform article picking.

Alternatively, determining the order picking position for the order to be picked for comprises: determining each of the articles required by the order to be picked for; and determining the order picking position for the order to be picked for according to a coincidence degree of the articles required between orders.

Alternatively, determining the order picking position for the order to be picked for according to a coincidence degree of the articles required between orders comprises, determining the order picking position according to at least one of the followings: for orders to be picked for which have higher coincidence degrees than a predetermined threshold in types of articles with each other, assigning order picking positions belonging to a same workstation, wherein one workstation comprises a plurality of order picking positions; Or assigning the order picking position from a workstation for the order to be picked for according to a descending sequence of a coincidence degree of articles of an order to be picked for with which have been assigned to the workstation.

Alternatively, wherein selecting one or more shelves carrying one or more of the articles required by the order to be picked for comprises: determining a set of shelf combinations required to accomplish the order to be picked for according to one or more articles carried on candidate shelves; determining each of a total length of paths from shelves belonging to a same shelf combination to the order picking position; and determining a shelf combination with the least total path length from the set of shelf combinations to perform article picking for the order to be picked for.

Alternatively, selecting one or more shelves carrying one or more of the articles required ny the order to be picked for comprises: determining a handling cost of a candidate shelf according to at least two of a number of each kind of the articles required by a workstation, an inventory of each kind of the articles on the shelf, a distance from the shelf to the workstation, or a position of a target article on the shelf, wherein, one workstation comprises a plurality of order picking positions, and the handling cost is in positive correlation with the number of each kind of the articles required by the workstation, in negative correlation with an inventory of a corresponding article on the shelf, and in positive correlation with a distance from the shelf to the workstation; and selecting the shelf with a lower handling cost to perform article picking for each order of the workstation.

Alternatively, the candidate shelves comprise at least one kind of shelves residing at order picking positions for picking one or more articles, shelves returning from order picking positions to predetermined positions, or shelves residing at the predetermined positions.

Alternatively, driving the one or more selected shelves to the order picking position comprises, in a case that a selected shelf is not carried by a shelf handling cart: selecting the shelf handling cart according to distances from available shelf handling carts to the selected shelf; planning a route to the selected shelf and a route of carrying the selected shelf to the order picking position for the shelf handling cart; and driving the shelf handling cart to a position of the selected shelf and to carry the selected shelf to the order picking position.

Alternatively, driving one or more selected shelves to the order picking position further comprises, in a case that the selected shelf is carried by the shelf handling cart: planning a route from a current position to the order picking position for the shelf handling cart carrying the selected shelf; and driving the cart to the order picking position along the route from the current position to the order picking position.

Alternatively, the article picking method further comprising: displaying each of the articles carried on the selected shelf which conforms to the articles required by one or more of the orders belonging to the order picking position when the selected shelf reaches the order picking position, so as to perform article picking in a manual or machine picking manner.

According to other embodiments of the present disclosure, a cargo sorting server is provided. The article picking server comprising: a picking position determining unit, configured to determine an order picking position for an order to be picked for according to one or more articles required by the order to be picked for; a shelf selecting unit, configured to select one or more shelves carrying one or more of the articles required by the order to be picked for according to information of one or more articles on candidate shelves and distances from the shelves to the order picking position; and a shelf driving unit, configured to drive one or more selected shelves to the order picking position to perform article picking.

Alternatively, the picking position determining unit is configured to: determine each of the articles required by the order to be picked for; and determine the order picking position for the order to be picked for according to a coincidence degree of the articles required in orders.

Alternatively, determine the order picking position for the order to be picked for according to a coincidence degree of the articles required in orders comprises, determining the order picking position according to at least one of the followings: for orders to be picked for which have higher coincidence degrees than a predetermined threshold in types of articles with each other, assigning order picking positions belonging to a same workstation, wherein one workstation comprises a plurality of order picking positions; Or assigning the order picking position from a workstation for the order to be picked for according to a descending sequence of a coincidence degree of articles of an order to be picked for with which have been assigned to the workstation.

Alternatively, the shelf selecting unit is configured to: determine a handling cost of a candidate shelf according to at least two of a number of each kind of the articles required by a workstation, an inventory of each kind of the articles on the shelf, a distance from the shelf to the workstation, or a position of a target article on the shelf, wherein, one workstation comprises a plurality of order picking positions, and the handling cost is in positive correlation with the number of each kind of the articles required by the workstation, in negative correlation with an inventory of a corresponding article on the shelf, and in positive correlation with a distance from the shelf to the workstation; select the shelf with a lower handling cost to perform article picking for each order of the workstation.

Alternatively, the shelf driving unit is configured to, in a case that a selected shelf is not carried by a shelf handling cart: select the shelf handling cart according to distances from available shelf handling carts to the selected shelf; plan a route to the selected shelf and a route of carrying the selected shelf to the order picking position for the shelf handling cart; and drive the shelf handling cart to a position of the selected shelf and to carry the selected shelf to the order picking position.

Alternatively, the shelf driving unit is configured to, in a case that the selected shelf is carried by the shelf handling cart: plan a route from a current position to the order picking position for the shelf handling cart carrying the selected shelf; and drive the cart to the order picking position along the route from the current position to the order picking position.

Alternatively, the article picking server further comprising: a display prompting unit, configured to prompt each of the articles carried on the selected shelf which conforms to the articles required by one or more of the orders belonging to the order picking position to a display equipment of the shelf or a display equipment of the order picking position, when the selected shelf reaches the order picking position, so as to perform article picking in a manual or machine picking manner according to a prompted information displayed.

According to other embodiments of the present disclosure, an article picking server is provided. The article picking server comprising: a memory; and a processor coupled to the memory, wherein the processor is configured to perform the method of article picking method based on instructions stored in the memory.

According to still further embodiments of the present disclosure, a computer-readable storage medium is provided. The computer-readable storage medium has stored thereon computer program instructions that, when executed by a processor, implement the article picking method mentioned hereinbefore.

In addition, according to some embodiments of the present disclosure, an article picking system is provided. The article picking system comprises: an article picking server mentioned hereinbefore; and, one or more shelves, configured to carry one or more articles, and be driven by the article picking server to respective order picking positions so as to perform article picking Alternatively, the article picking system further comprising: one or more shelf handling carts, configured to be driven by the article picking server to carry the shelves for movement.

Alternatively, the article picking system further comprising: one or more display devices located on the shelves or at order picking positions, which are configured to display each of the articles carried on the selected shelf which conforms to the articles required by one or more of the orders belonging to the order picking position according to prompting information from the article picking server, when the selected shelf reaches the order picking position, so as to perform article picking in a manual or machine picking manner.

BRIEF DESCRIPTION OF THE DRAWINGS

The drawings described herein are used to provide a further understanding of the present disclosure and constitute a part of the present disclosure. The illustrative embodiments of the present disclosure as well as the descriptions thereof, which are used for explaining the present disclosure, do not constitute improper definitions on the present disclosure. In the accompanying drawings.

DETAILED DESCRIPTION

The technical solution of the present disclosure will be described in further detail below by way of the accompanying drawings and the embodiments.

Figure 1:
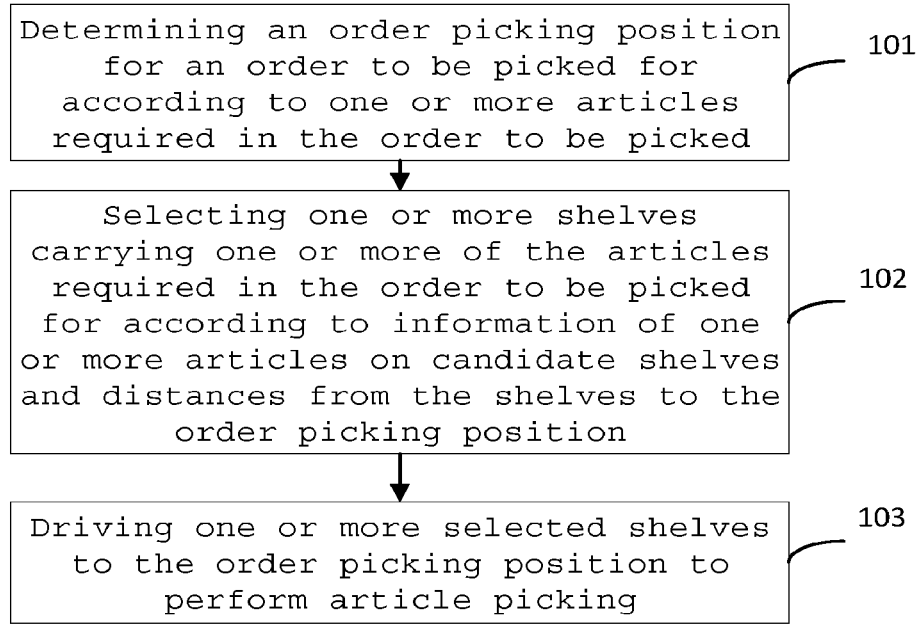
FIG. 1 is a flowchart of an article picking method according to some embodiments of the present disclosure.

FIG. 1 shows a flowchart of an article picking method according to some embodiments of the present disclosure.

Figure 10:
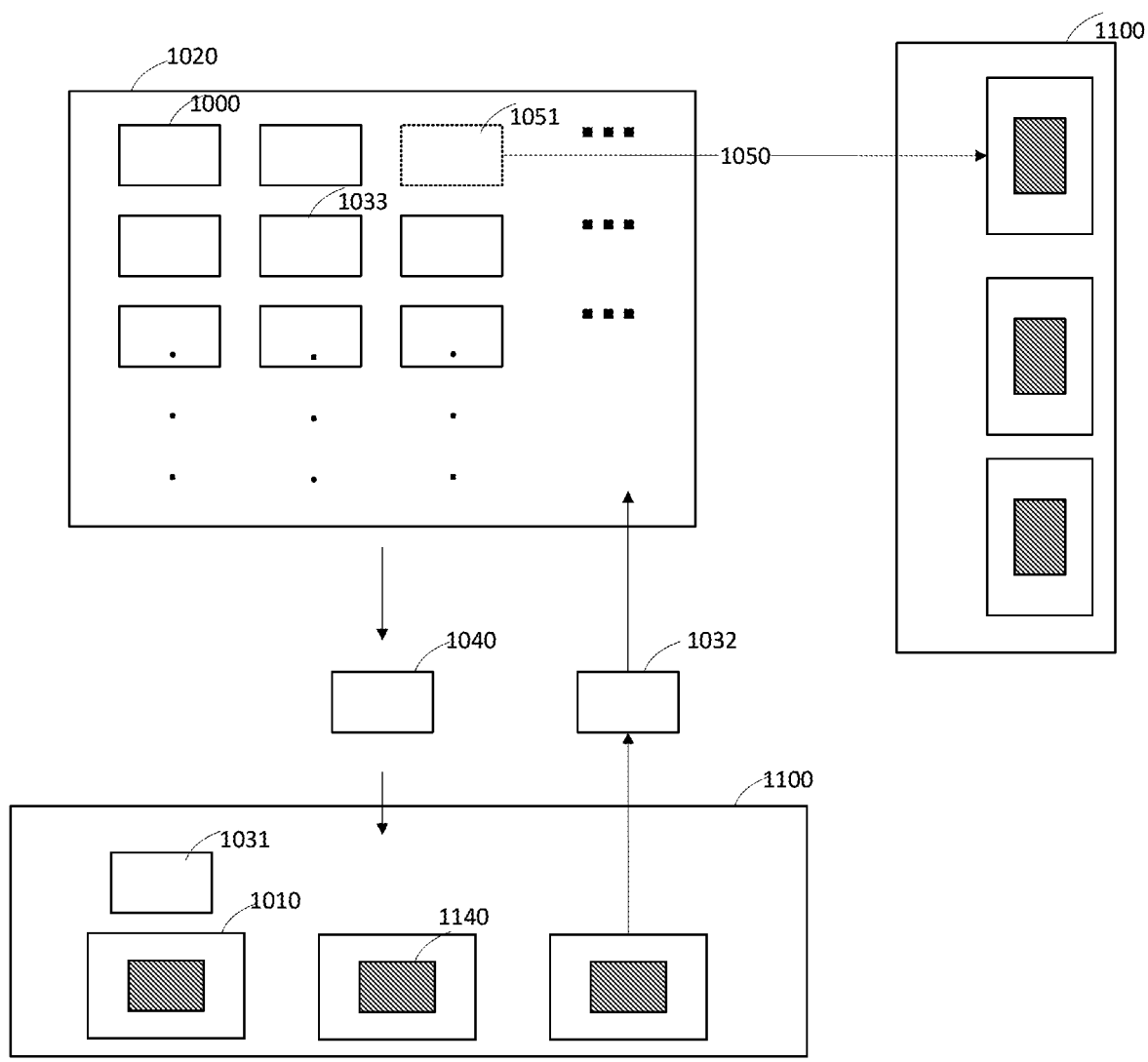
FIG. 10 is a schematic view of order picking station according to some embodiments of the present disclosure.

In step 101, an order picking position for an order to be picked for is determined according to one or more articles required by the order. In some embodiments, a suitable order picking position may be assigned according to the type of articles in orders to be picked for. For example, if an order mostly needs apparel articles, the order should be assigned to an order picking position which mostly processes apparel articles. In some embodiments, according to articles required by a plurality of orders to be picked for, the orders that require similar articles, or the orders with a higher coincidence degree comparing with a preset value, may be allocated to a same workstation, where one workstation includes a plurality of order picking positions. As shown in FIG. 10, one workstation 1100 includes a plurality of order picking positions 1010. A coincidence degree is the ratio of the number of types of coincidence articles between orders, to the types of articles required by the order to be picked for, wherein the coincidence articles between orders is the articles both needed by the order to be picked for and an other order. For example, an order A1 needs articles B1, B2, B3 and B4, and an order A2 needs articles B1 and B2. The coincidence degree for A2 between A1 and A2 is 100%, 100% which is higher than a preset value (for example 40%). Then when determining an order picking position for order A2, the order A1 and A2 will be assigned to order picking positions which belongs to a same workstation.

Figure 12:
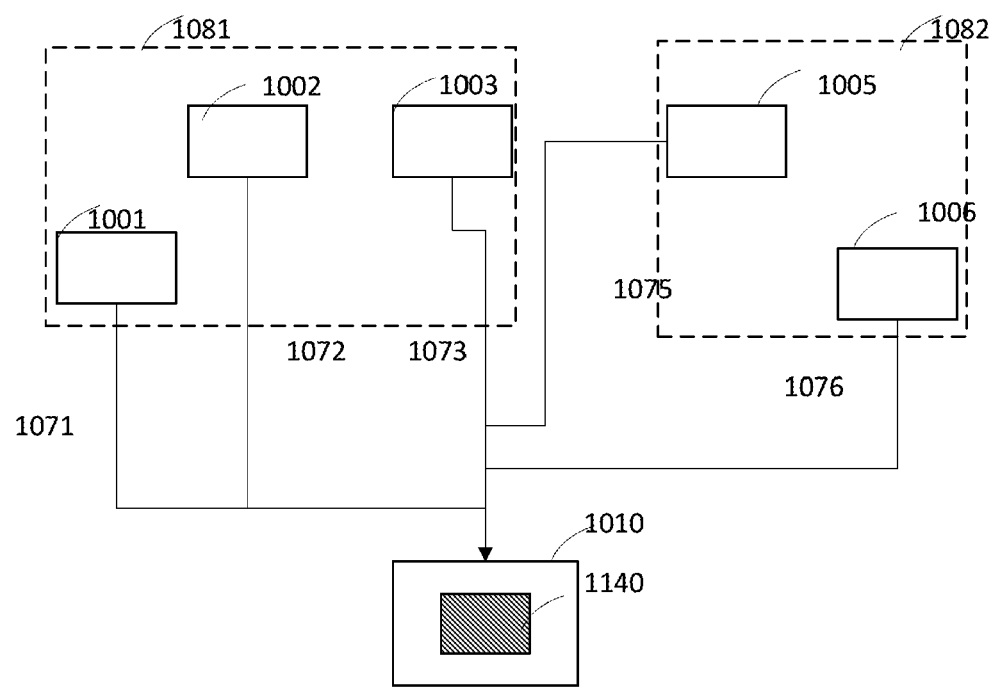
FIG. 12 is a schematic view of the total length of paths from shelves belonging to the same shelf combination to the order picking position, according to some embodiments of the present disclosure.

In step 102, according to information of articles on candidate shelves and distances from the shelves to the order picking position, one shelf or several shelves can be selected, and the selected shelf carries at least one kind of the articles required by the order to be picked for. In some embodiments, to satisfy the order to be picked for, several shelves should be selected according to the articles carried on candidate shelves, and these shelves is named as a shelf combination. In some embodiments, the candidate shelves consists of shelves residing at order picking positions for picking one or more articles, shelves returning from order picking positions to predetermined positions, and shelves residing at the predetermined positions, which is shown in FIG. 12. In some embodiments, it is possible to determine a set of shelf combinations required to accomplish the order according to the articles carried on candidate shelves, and then calculate each of a total length of paths from the location of shelves belonging to a same shelf combination to the order picking position, and select a shelf combination with a minimum total length of paths in a set of shelf combinations for the order, thereby a path cost for moving a shelf is reduced. The total length of each shelf combination is shown in FIG. 12.

Figure 11:
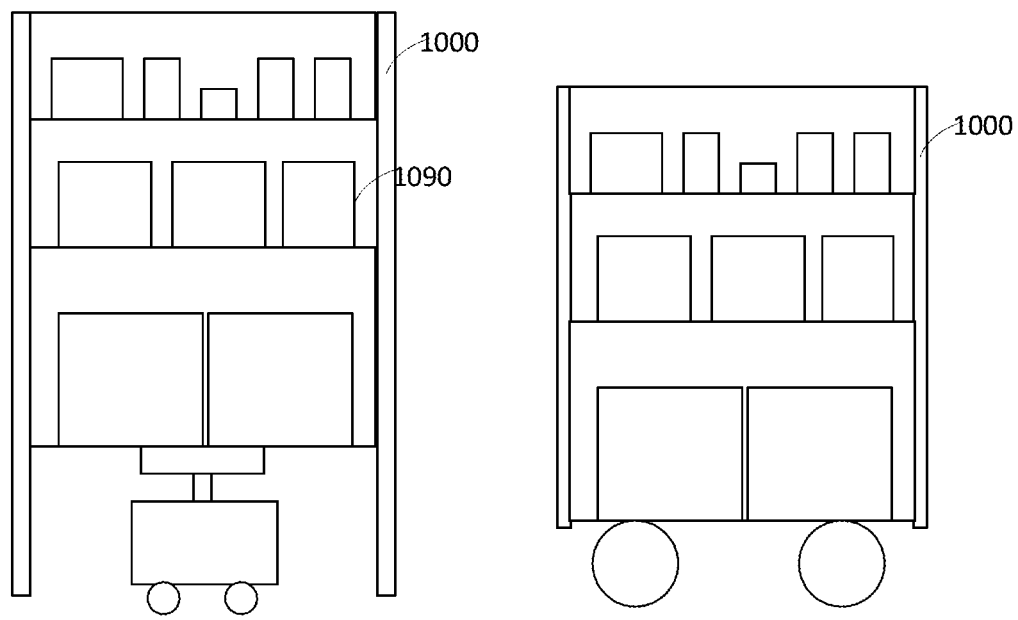
FIG. 11 is a schematic view of the shelf according to some embodiments of the present disclosure.

In step 103, one or more shelves are driven to an order picking position to perform article picking. In some embodiments, as shown in FIG. 11, a shelf may have a moving device and the shelf can be self-driven; or the shelf may be carried and moved by a shelf handling cart.

By way of such method, it is possible to assign an order picking position according to articles required by the order to be picked for, and further select one or more shelves according to articles on each shelf and a position of each shelf, and then move the selected shelf to the order picking position so as to perform article picking. Thereby the efficiency and accuracy of order picking is improved.

In some embodiments, when determining order picking positions for a plurality of orders, it is possible to obtain an order priority, and process orders containing special time limits and orders involving trans-regional production at a priority, thereby satisfying the time limit requirements of orders and improving the user experience.

Figure 2:
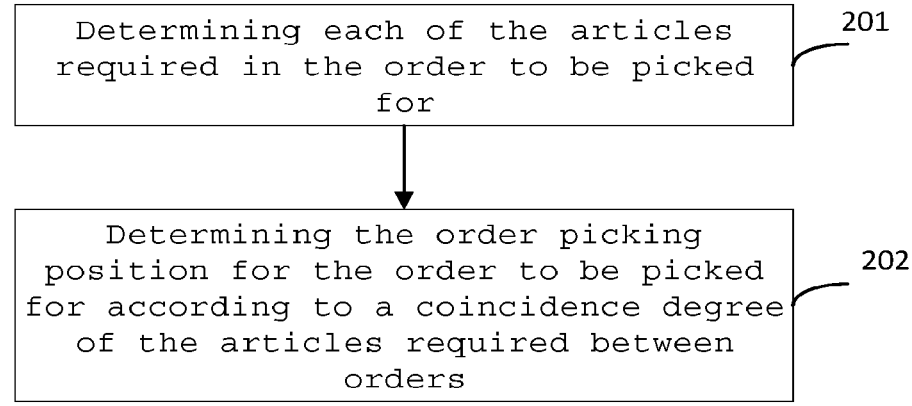
FIG. 2 is a flowchart of determining an order picking position for an order in the article picking method according to some embodiments of the present disclosure.

FIG. 2 shows a flowchart of determining an order picking position for an order in the article picking method according to some embodiments of the present disclosure, wherein the selected shelf for the order will be driven to the determined order picking position, the articles for the order will be picked in the determined order picking position.

In step 201, each of the articles required by the order to be picked for is determined, wherein the "order to be picked for" means an order which the articles will be picked for.

In step 202, the order picking position for the order to be picked for is determined according to the coincidence degree in orders. For example: the coincidence degree of an order A relative to an order B=(an amount of kinds of SKUs in order A's SKU list which is contained in order B's SKU list)/(a total amount of kinds of SKUs in order A's SKU list), wherein SKU means Stock Keeping Unit.

In some embodiments, it is possible to compare a plurality of orders to which the order picking positions have not been assigned, and assign orders which have a high coincidence degree in article types to order picking positions pertaining to a same workstation at a priority, thereby facilitating dispatching a same shelf to pick articles for a plurality of orders, so as to reduce shelf dispatch and improve the efficiency of article picking.

In some embodiments, it is possible to compare the order to which an order picking position has not been assigned with orders that are being picked at each workstation, and assign to the order an order picking position in a workstation with a high coincidence degree with one or more articles in orders available in the workstation at a priority, thereby enabling conveniently driving a shelf which is picking articles for an order to pick articles for a new order, thus improve the efficiency of article picking.

In some embodiments, the orders that have not yet been determined their order picking positions are compared with each other, and determine the coincidence degree between orders. If the coincidence degree is higher than a preset degree, then order picking position will be selected from a same workstation for these orders at a priority. What's more, the order that have not yet been determined its order picking position is compared with orders that are being processing at each workstation, and the coincidence degree of the order to be selected its order picking position to the orders processing in the workstation is determined. If the coincidence degree is higher than a preset degree, the corresponding workstation is selected, and an order picking position will be selected from this workstation at a priority. Such a method facilitates dispatching the same shelf to pick articles for a plurality of orders, and also enables conveniently driving a shelf which is picking articles to pick articles for a new order, and thus improves the efficiency of article picking.

By way of such method, it is possible to assign the order picking position to an order according to the coincidence degree between orders, so that orders having a higher coincidence degree are picked at adjacent positions, thereby reducing the number of the dispatched shelves, and avoiding congestion and collision of the shelves whilst reducing the cost on one hand, and also improving the efficiency of article picking on the other hand.

In some embodiments, when selecting a workstation for the order, it is also possible to consider about occupation conditions of workstations, and select a relatively idle workstation, that is, select a workstation with a least number of shelves waiting at a standby position (the shelves that have reached the workstation and waiting for unloading articles), or select the workstation processing least number of orders, thereby implementing balancing a workload of each workstations.

In some embodiments, after an order is received, it is possible to first analyze the number of idle order picking positions available at each workstation, and then sequence the orders to which order picking positions are to be determined according to priorities, and group the orders to which order picking positions are to be determined according to coincidence degrees among the orders, and then select a workstation for each group of the orders, and bind each order to an order picking position. By way of such method, it is possible to determine an order picking position by comprehensively considering factors at a plurality of aspects, thus reduce a workload for driving shelf movement.

In some embodiments, the principle of "less dispatched shelves" may be followed. To obtain a shelf set that satisfies an article to be picked, an available inventory of the shelves during moving to depart from a warehouse and moving to return to a warehouse will be checked first, and an available inventory of shelves that have returned to a storage position will be check next, thereby reducing the shelf moving cost.

In some embodiments, it is avoided that a shelf during moving to depart from a warehouse is recommended to a different workstation, thereby a shelf being dispatched for a long distance which will reduce the efficiency is avoided, what's more, interrupting a current article picking work or a next article picking work being delayed by the current article picking work is avoided, so as to improve the stability of the system.

Figure 3:
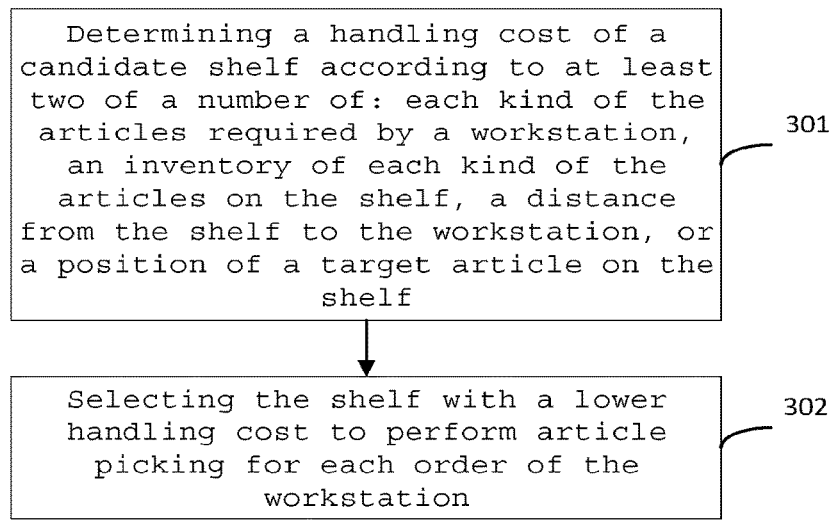
FIG. 3 is a flowchart of selecting one or more shelves in the article picking method according to some embodiments of the present disclosure.

FIG. 3 shows a flowchart of selecting one or more shelves in the article picking method according to some embodiments of the present disclosure.

In step 301, a handling cost for each of the candidate shelves is determined. The candidate shelves may include one or more kinds of shelves of: shelves residing at order picking positions for picking one or more articles (as shown in FIG. 10, 1031), shelves returning from order picking positions to predetermined positions (as shown in FIG. 10, 1032), or shelves residing at the predetermined positions (as shown in FIG. 10, 1033), so as to prevent articles picking work of shelves from being interrupted.

In some embodiments, the handling cost for candidate shelves may be determined according to at least two of: the amount of each kind of the articles required by a workstation, the inventory of each kind of the articles on the shelf, the distance from the shelf to the workstation, or the position of the target article on the shelf. The handling cost is in positive correlation with the amount of each kind of the articles required by the workstation, in negative correlation with the inventory of the corresponding article on the shelf, and in positive correlation with the distance from the shelf to the workstation. The handling cost is in positive correlation with the amount of each kind of the articles required by the workstation means that, the handling cost is higher when the amount of each kind of the articles required by the workstation is larger. The handling cost is in negative correlation with the inventory of the corresponding article on the shelf means that, the handling cost is lower when an inventory of a corresponding article on the shelf is larger. The handling cost is in positive correlation with the distance from the shelf to the workstation means that, the handling cost is higher when a distance from the shelf to the workstation is longer. For example, the handling cost=(a demanded amount of the articles at the workstation−an amount that the shelf can satisfy according to its inventory)+a distance cost for handling shelf to the workstation.

In some embodiments, the cost for the distance from the handling shelf to the workstation may be calculated using the shortest path algorithm (Dijkstra algorithm) and the conversion map.

In some embodiments, if the shelf includes front and back sides, when it is determined that the article is located on one side of the shelf facing away from the order picking position, the cost for the distance from the handling shelf to the workstation may also include the cost for turning over the shelf.

In step 302, a shelf with a lower handling cost is selected to pick one or more articles for each order in the workstation.

By way of such method, it is possible to determine the handling cost by comprehensively considering factors which affect the picking efficiency and cost in various aspects, and further select the shelf with a lower cost to pick an article for each order in the workstation according to the handling cost, thereby further improving the picking efficiency and reducing the picking cost.

Figure 4:
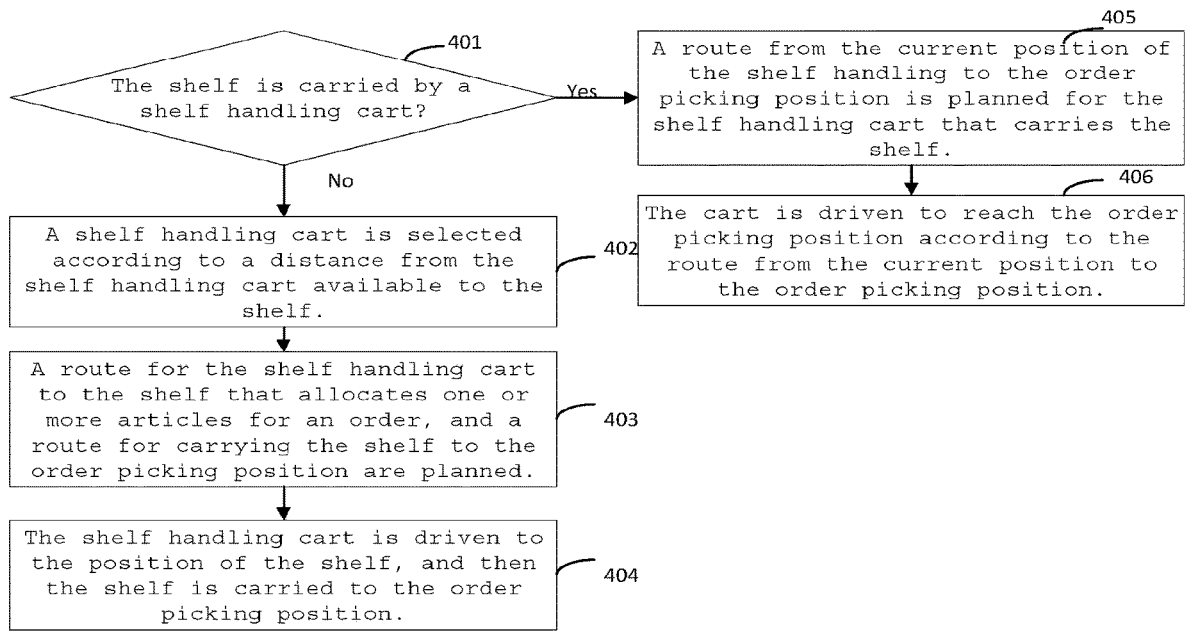
FIG. 4 is a flowchart of driving one or more shelf handling carts in an article picking method according to some embodiments of the present disclosure.

In some embodiments, when a selected shelf is determined, a shelf handling cart may be selected to handle a shelf. FIG. 4 shows a flowchart of driving a shelf handling cart in an article picking method according to some embodiments of the present disclosure.

In step 401, it is determined whether the shelf is carried by a shelf handling cart. If the shelf is being carried by a handling cart, the step 405 is performed. If the shelf is located at a storage position and is not carried by a handling cart, the step 402 is performed.

In step 402, a shelf handling cart is selected according to a distance from the shelf handling cart available to the shelf.

In step 403, a route for the shelf handling cart to the shelf that sends one or more articles for an order, and a route for carrying the shelf to the order picking position are planned. In some embodiments, it is possible to plan the paths using the shortest path algorithm, and at the same time, to avoid congestion caused by different carts passing by the same position at the same time, the routes that have been planned should be considered.

In step 404, the shelf handling cart is driven to the position of the shelf, and then the shelf is carried to the order picking position.

In step 405, a route from the current position of the shelf handling to the order picking position is planned for the shelf handling cart that carries the shelf.

In step 406, the cart is driven to reach the order picking position according to the route from the current position to the order picking position. In some embodiments, the shelf handling cart needs to handle the shelf for movement after the picking task currently performed is accomplished.

By way of such method, it is possible to select a suitable shelf handling cart to carry the shelf to pick one or more articles for an order, and to plan a path for the cart, thereby shelf collision caused by crossed paths of carts is avoided, and a uniform coordination ability is improved whilst flexibly handling the shelves is implemented.

Figure 5:
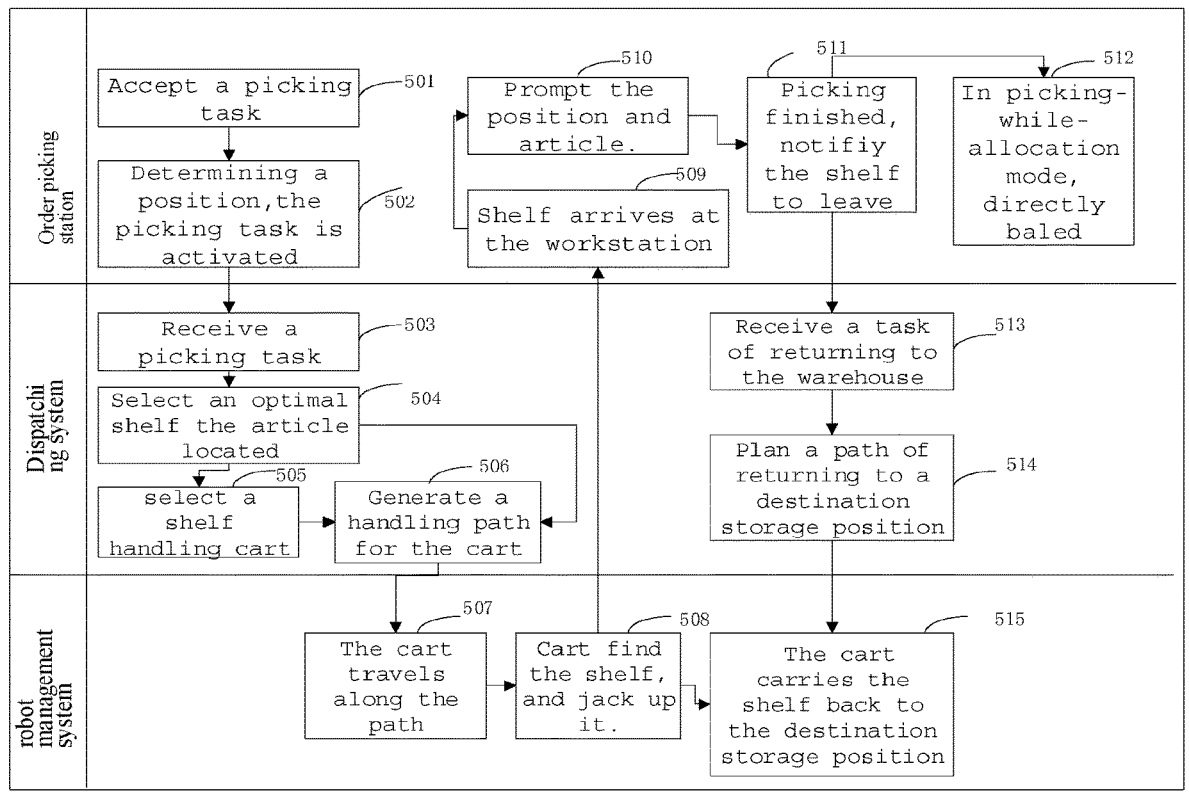
FIG. 5 is a flowchart of an article picking method according to other embodiments of the present disclosure.

FIG. 5 shows a flowchart of an article picking method according to other embodiments of the present disclosure.

In step 501, a picking station receives an order and accepts a picking task.

In step 502, an order picking position is assigned to an order by any method of determining an order picking position mentioned hereinbefore, and the picking task is activated, thereby a dispatching system is begin notified to perform article picking.

In step 503, the dispatching system receives a picking task.

In step 504, the dispatching system selects an optimal shelf where the article is located using any one of the shelf selection method hereinbefore. In some embodiments, the same articles are scattered on different shelves, so as to meet the requirements that the same articles are picked from a plurality of shelves at the same time, and thus avoid standby for picking.

In step 505, the dispatching system selects a shelf handling cart.

In step 506, a handling path is generated according to the position of the shelf and the position of the handling cart, and then sent to the shelf handling cart.

In step 507, the shelf handling cart which pertains to a robot management system travels along a path obtained from the dispatching system.

In step 508, the shelf handling cart finds a designated shelf, jacks up the shelf, and then travels from the shelf to the workstation according to the path planned by the dispatching system.

In step 509, the shelf handling cart carries the shelf to the workstation.

In step 510, the type of articles to be picked and the number of each type of articles are displayed on the shelf or at the workstation. In some embodiments, the order picking position where the article should be dropped to may also be displayed, thereby improving the accuracy of article picking.

In some embodiments, the shelf may reach the workstation, and the article is picked by a machine or manually to a respective order picking position, thereby reducing the difficulty in planning a path of the cart and reducing the workload of path planning; in some other embodiments, the shelf may reach an order picking position where its article is required, thereby further shortening a distance of article picking manually or by machine from the shelf to the order picking position, and improving the degree of automation.

In step 511, picking accomplishment is determined by manual triggering or according to detection of the sensor, then the shelf is notified to leave a current position.

In step 512, if the current mode is a picking-while-allocation mode, an order with a picking number may be directly baled for delivery.

In step 513, the dispatching system receives a task of returning to the warehouse.

In step 514, the dispatching system plans a path for the shelf to return to a destination storage position.

In step 515, the shelf handling cart carries the shelf back to the destination storage position of the shelf. After returning to the destination storage position, the shelf handling cart drops the shelf and returns to its original position to wait for a next deployment.

In such recommended shelf picking manner of shelf-to-person based on AGV (Automated Guided Vehicle), there is no need to distribute an order by manual control. After an order is successfully initialized, the system automatically groups the order to recommend the optimal shelf to the workstation, and then prompt a picking position and a number for picking by a person or machine. A plurality of orders may be processed by a same workstation at the same time, in a picking-while-allocation manner. The picking is synchronously checked so that the product may be forwarded directly to the baling station for baling after picking. There is no need to check manually again, thereby lessening the operation procedure, reducing the cost and improving the efficiency.

In some embodiments, a plurality of orders may be picked at one time after the shelf leave the storage position, or articles are picked for a plurality of orders after a single time of article picking, thereby further reducing shelf dispatching cost and improving the efficiency of article picking.

In some embodiments, if the dispatching system assigns a new task to the shelf before the shelf returns to the destination storage position, the shelf handling cart ceases the movement of carrying the shelf back to the storage position and begins to perform a new task instead from the current position, thereby further improving the efficiency of article picking. In some embodiments, the shelf that is being carried by the shelf handling cart may be dispatched at a priority, so as to omit the step of carrying the shelf out of the warehouse by the shelf handling cart, thus improving the efficiency of article picking.

Figure 6:
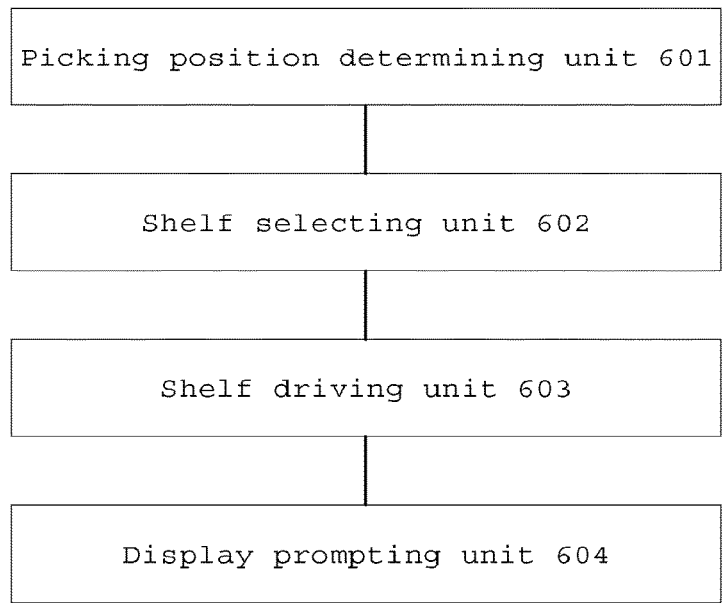
FIG. 6 is a schematic view an article picking server according to some embodiments of the present disclosure.

FIG. 6 shows a schematic view an article picking server according to some embodiments of the present disclosure. The picking position determining unit 601 can determine an order picking position for an order to be picked for according to one or more articles required by the order. The shelf selecting unit 602 can select one or more shelves carrying at least one kind of the articles required by the order, according to information of articles on candidate shelves and distances from the shelves to the order picking position. The shelf driving unit 603 can drive a shelf to an order picking position to perform article picking. In some embodiments, the shelf may have a moving device and the shelf can be self-driven, or the shelf may be carried and moved by a shelf handling cart.

Such article picking server can assign an order picking position according to one or more articles required by the order to be picked for, and further select one or more shelves according to articles on each shelf and a position of each shelf, and then move the selected shelf to the order picking position so as to perform article picking. Thereby the efficiency and accuracy of order picking is improved.

In some embodiments, the picking position determining unit 601 can first determine each of the articles required by the order to be picked for, and then assign an order picking position for the order according to the coincidence degree between orders. For example: the coincidence degree of an order A relative to an order B=(an amount of kinds of SKUs in order A's SKU list which is contained in order B's SKU list)/(a total amount of kinds of SKUs in order A's SKU list). The strategy for allocating the order picking position may be as shown in the related embodiment of FIG. 2.

Such article picking server can assign the order picking position for an order according to the coincidence degree between orders, so that orders having a higher coincidence degree are picked at adjacent positions, thereby reducing the number of the dispatched shelves, and avoiding congestion and collision of the shelves whilst reducing the cost on one hand, and also improving the efficiency of article picking on the other hand.

In some embodiments, the shelf selecting unit 602 can obtain a set of shelf combinations required to complete an order according to articles carried on candidate shelves, and further calculate each of a total length of paths from the location of shelves belonging to a same shelf combination, to the order picking position. And then a shelf combination with a minimum total length of paths in a set of shelf combinations is selected for the order, thereby a path cost for moving a shelf is reduced.

In other embodiments, the shelf selecting unit 602 may determine handling cost of candidate shelves according to the method in the related embodiment of FIG. 3, and select a shelf with a lower handling cost to pick articles for each order in the workstation, so that it is possible to determine the handling cost by comprehensively considering factors which affect the picking efficiency and cost in various aspects, and further select the shelf with a lower cost to pick an article for each order in the workstation according to the handling cost, thereby further improving the picking efficiency and reducing the picking cost.

In some embodiments, the candidate shelves are not limited to the shelves that are at a storage position, may also include one or more of: shelves residing at order picking positions for picking one or more articles, shelves returning from order picking positions to predetermined positions, thereby expanding a candidate space of the shelves.

In some embodiments, the shelf driving unit 603 may first determine a current state of the shelf selected by the shelf selecting unit 602, and then determine whether the shelf is carried by a shelf handling cart.

If the shelf is located at a storage position and is not carried by the shelf handling cart, the shelf handling cart is selected according to the distance from the shelf handling cart available to the shelf; a route for the shelf handling cart to the shelf that sends one or more articles for the order and a route for carrying the shelf to the order picking position are planned. In some embodiments, it is possible to plan the paths using the shortest path algorithm, and at the same time, to avoid congestion caused by different carts passing by the same position at the same time considering the routes that have been planned. The shelf handling cart is driven to the position of the shelf and the shelf is carried to the order picking position.

If the shelf is being carried by the handling cart, a route from the current position to the order picking position is planned for the shelf handling cart that carries the shelf. The cart is driven to reach the order picking position according to the route from the current position to the order picking position. In some embodiments, the shelf handling cart needs to handle the shelf for movement after the picking task currently performed is accomplished.

Such article picking server can select a suitable shelf handling cart to carry the shelf to pick one or more articles for an order, and to plan a path for the cart, thereby shelf collision caused by crossed paths of carts is avoided, and a uniform coordination ability is improved whilst flexibly handling the shelves is implemented.

In some embodiments, as shown in FIG. 6, the article picking server may further include a display prompting unit 604, which can prompt each of the articles on the shelf which is required by the order in the order picking position to a display device of the shelf or a display device at the order picking position, so that article picking may be performed in a manual or machine picking manner according to the displayed prompting information, thereby improving the accuracy of order picking.

In some embodiments, the shelf may reach the workstation, and the articles required by the present workstation may be unloaded from the shelf by a machine or manually, and then picked to each order picking position, thereby reducing the difficulty of planning the path of the cart, and lessening the workload of path planning. The article that should be unloaded from the shelf may be displayed on the workstation or shelf, thereby helping a worker or a machine to unload them at one time, thus the picking efficiency is improved.

In other embodiments, the shelf may reach an order picking position where its article is required, thereby further shortening a distance of article picking manually or by machine from the shelf to the order picking position, and thus improving the degree of automation.

Figure 7:
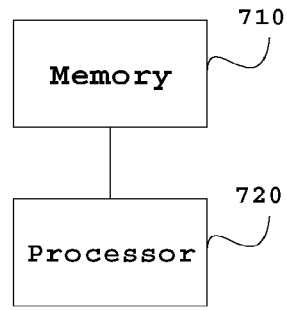
FIG. 7 is a schematic view of the article picking server according to other embodiments of the present disclosure.

FIG. 7 is a schematic structural view of an article picking server according to some embodiments of the present disclosure. The article picking server includes a memory 710 and a processor 720. The memory 710 may be a magnetic disk, a flash memory, or any other non-volatile storage medium. The memory is configured to store the instructions in the corresponding embodiments of the article picking method hereinbefore. The processor 720 which is coupled to the memory 710 may be implemented as one or more integrated circuits, such as a microprocessor or a microcontroller. This processor 720 which is configured to execute instructions stored in a memory, such an order picking manner of driving shelves to the order picking position is realized, and the efficiency and accuracy of order picking is improved.

Figure 8:
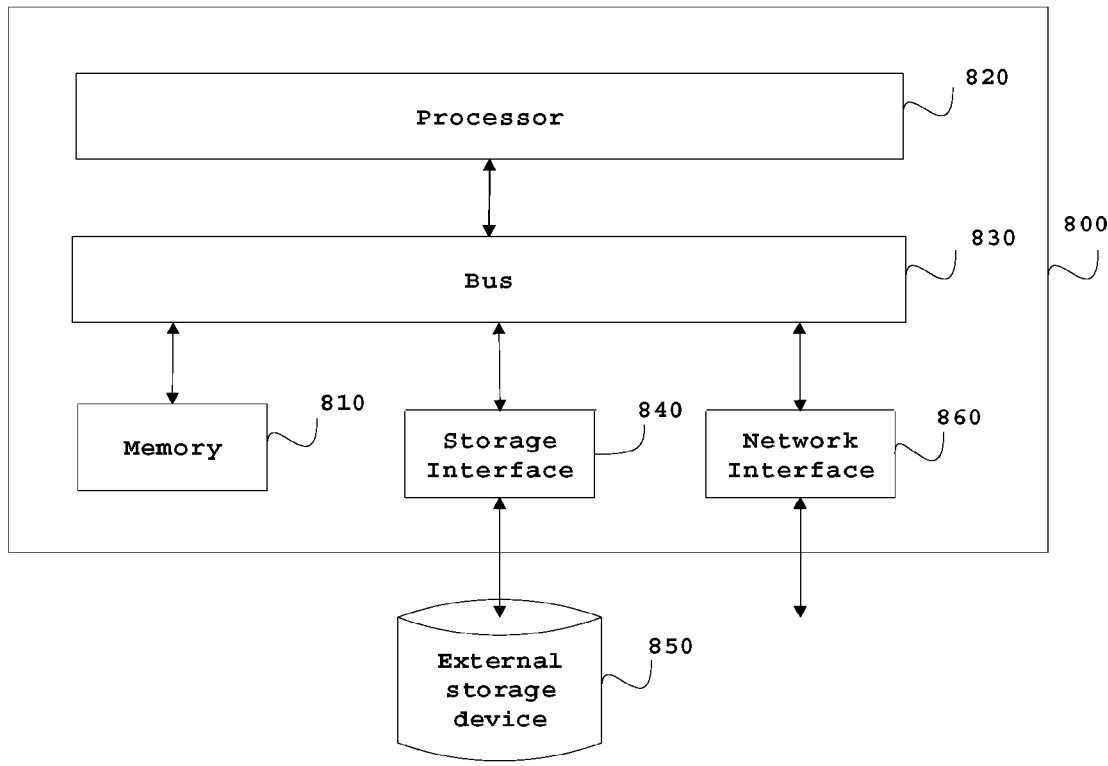
FIG. 8 is a schematic view of the article picking server according to further embodiments of the present disclosure

In some embodiments, as also shown in FIG. 8, the article picking server 800 includes a memory 810 and a processor 820. The processor 820 is coupled to the memory 810 through a BUS 830. This article picking server 800 may also be connected to an external storage device 850 through a storage interface 840 to call external data, and may also be connected to a network or another computer system (not shown) through a network interface 860, which will not be introduced in detail here.

In this embodiment, by storing data instructions in a memory and processing the above-described instructions by a processor, it is possible to implement such an order picking manner as to drive a shelf to an order picking position, thereby improving the efficiency and accuracy of order picking.

In other embodiments, there is a computer-readable storage medium, which stores computer program instructions thereon, and when executed by a processor, implement steps of a method in the corresponding embodiments of the article picking method. Those skilled in the art should understand that the embodiments of the present disclosure may be provided as a method, an apparatus, or a computer program product. Therefore, the present disclosure may take the form of an entirely hardware embodiment, an entirely software embodiment, or an embodiment combining software and hardware aspects. Moreover, the present disclosure may take the form of a computer program product implemented on one or more computer-usable non-transitory storage media (including but not limited to disk storage, CD-ROM, optical storage and the like) containing computer-usable program codes therein.

Figure 9:
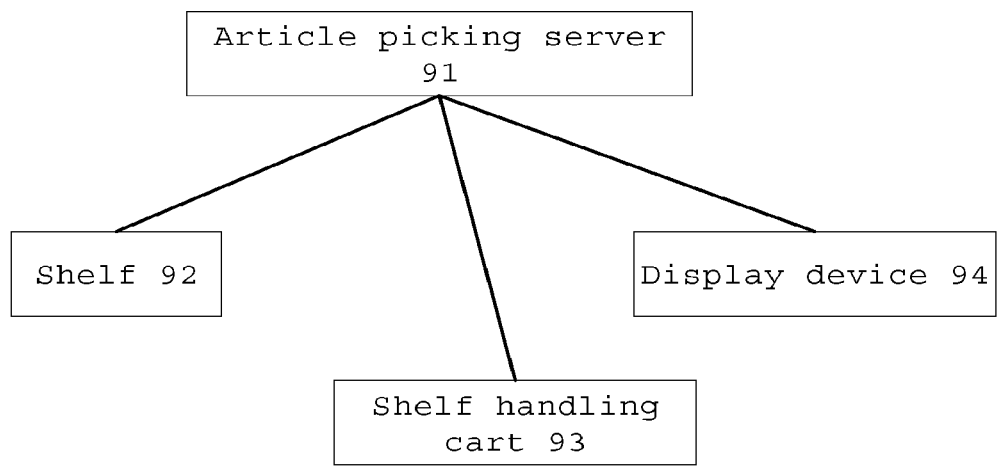
FIG. 9 is a schematic view of an article picking system according to some embodiments of the present disclosure.

FIG. 9 shows a schematic view of an article picking system according to some embodiments of the present disclosure. The article picking server 91 may be any of the article picking servers mentioned hereinbefore. The shelf 92 can carry one or more articles, and can be driven by the article picking server to a respective order picking position to perform article picking.

Such article picking system can assign an order picking position according to articles required by the order, and further select shelf according to articles on the shelf and a position of the shelf, then the selected shelf is driven to the order picking position to perform article picking. Thereby the efficiency and accuracy of order picking is improved.

In some embodiments, the article picking system may further include one or more shelf handling carts 93 which can be driven by the article picking server to carry the shelf for movement. Such article picking system can select a suitable shelf handling cart to carry a shelf to send one or more articles for an order, and to plan a path for the cart, thereby avoiding shelf collision caused by crossed paths of carts and improving a uniform coordination ability whilst implementing flexibly handling the shelves.

In some embodiments, the article picking system may further include a display device 94 attached on the shelf or located at the order picking position, which can display each of the articles required by the order that conforms to the articles required by one or more of the orders belonging to the order picking position, according to prompting information from the article picking server, when the selected shelf reaches the order picking position, so as to perform article picking in a manual or machine picking manner, thereby improving the efficiency and accuracy of article picking.

In some embodiments, the display device may also be located at a position of the workstation, to display each of the articles carried on the shelf which is required in each order that conforms to the present workstation, as well as display the corresponding order picking position, so as to facilitates uniform picking at the workstation and allocation to each order.

Figure 13:
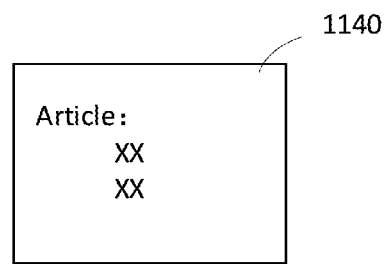
FIG. 13 is a schematic view of the display according to some embodiments of the present disclosure.

In some embodiments, as shown in FIG. 10, there are many shelves in the warehouse 1020, and each shelf 1000 is in their predetermined position in the situation of without being scheduled. There are more than one workstations 1060 in the order picking station, and each workstation comprises a plurality of order picking positions 1010, wherein for an order to be picked for, the order picking position is assigned from the order picking positions in the workstations 1100. In some embodiments, each order picking position 1010 has a display device 1140. In some embodiments, the information that displayed on the display device is as shown in FIG. 13, which shows that, in this order picking position, which articles on the shelf need to be picked. In some embodiments, the display device 1140 can also be set in an area of the workstation, on be attached on each shelf.

The candidate shelves include shelves residing at order picking positions for picking one or more articles (shown as shelf 1031), shelves returning from order picking positions to predetermined positions (shown as shelf 1032), and shelves residing at the predetermined positions (shown as shelf 1033). Assuming that the shelf 1051 is to be dispatched to the uppermost order picking position of the workstation on the right, a route 1050 is planned for the shelf 1051. Then shelf 1051 is carried by a shelf handling cart, the shelf handling cart is driven to the order picking position along the route 1050.

A shelf 1040 is shown as for example, is driving to order picking position. In some embodiments, as shown in FIG. 11, the shelf is as the left one, carried by a shelf handling cart; or the shelf is as the right one, which has moving device, thus the shelf can move by itself. A storage area is provided on the shelf, and 1090 shows a position of a target article on the shelf.

In some embodiments, as shown in FIG. 11, assuming that the articles required by an order can be satisfied by shelves 1001, 1002 and 1003, or satisfied by shelves 1005 and 1006. Then, shelves 1001, 1002 and 1003 are a shelf combination 1081, the total path length from shelves belonging to this shelf combination to the order picking position is $length_{1071}+length_{1072}+length_{1073}$. Shelves 1005 and 1006 are another shelf combination 1082, the total path length from shelves belonging to this shelf combination to the order picking position is $length_{1075}+length_{1076}$.

The present disclosure is described with reference to the flow charts and/or block diagrams of methods, devices (systems), and computer program products according to the embodiments of the present disclosure. It will be understood that each step and/or block of the flow charts and/or block diagrams as well as a combination of steps and/or blocks of the flow charts and/or block diagrams may be implemented by a computer program instruction. These computer program instructions may be provided to a processor of a general purpose computer, special purpose computer, an embedded processing machine, or other programmable data processing devices to produce a machine, such that the instructions executed by a processor of a computer or other programmable data processing devices produce a device for realizing a function designated in one or more steps of a flow chart and/or one or more blocks in a block view.

These computer program instructions may also be stored in a computer readable memory that may guide a computer or other programmable data processing device to operate in a particular manner, such that the instructions stored in the computer readable memory produce a manufacture including an instruction device. The instruction device realizes a function designated in one or more steps in a flow chart or one or more blocks in a block view.

These computer program instructions may also be carried onto a computer or other programmable data processing devices, such that a series of operational steps are performed on a computer or other programmable device to produce a computer-implemented processing, such that the instructions executed on a computer or other programmable devices provide steps for realizing a function designated in one or more steps of the flow chart and/or one or more blocks in the block view.

Heretofore, the present disclosure has been described in detail. Some details well known in the art are not described to avoid obscuring the concept of the present disclosure. According to the above description, those skilled in the art would fully know how to implement the technical solutions disclosed herein.

The method and device of the present disclosure may be implemented in many manners. For example, the method and device of the present disclosure may be implemented by a software, hardware, firmware, or any combination of a software, hardware, and firmware. The above-described sequence of steps for the method is for illustrative purposes only, and the steps of the method of the present disclosure are not limited to the sequence specifically described above unless otherwise specifically stated. Moreover, in some embodiments, the present disclosure may also be embodied as programs recorded in a recording medium, which include machine readable instructions for implementing the method according to the present disclosure. Thus, the present disclosure also covers a recording medium that stores programs for performing the method according to the present disclosure.

Finally, it should be explained that: the aforementioned embodiments are only used to describe the technical solution of the present disclosure rather than limiting the same; although detailed explanations are made to the present disclosure by referring to preferred embodiments, a common technical person in the art should understand that: it is still possible to make amendments to the embodiments of the present disclosure or make equivalent replacements to part of the technical features; without departing from the spirit and scope of the present disclosure, they should all be covered in the scope of the technical solution for which protection is sought in the present disclosure.

What is claimed is:

1. An article picking method, comprising:
   determining an order picking position for an order to be picked based on one or more articles required in the order, the determining the order picking position comprising:
      determining each of the articles required in the order to be picked, and
      determining the order picking position for the order to be picked based on a coincidence degree of the articles required between the order to be picked and other orders,
      wherein the coincidence degree is a ratio of a number of kinds of coincidence articles between the order to be picked and other orders, to kinds of articles required by the order to be picked;
   selecting one or more shelves from candidate shelves, the one or more selected shelves each carry at least one of the articles that are required by the order to be picked, wherein the one or more shelves are selected based on:
      one or more articles on each of the shelves, and distances from each of the candidate shelves to the order picking position, the candidate shelves consisting of:
      shelves residing at order picking positions for picking one or more articles,
      shelves returning from order picking positions to predetermined positions, and
      shelves residing at the predetermined positions; and
   driving the one or more selected shelves to the order picking position to perform article picking.

2. The article picking method according to claim 1, wherein determining the order picking position for the order to be picked based on the coincidence degree further comprises at least one of the following:
   comparing orders for which the order picking position has not been determined, and determining the coincidence degree between those orders and the order to be picked; wherein if the coincidence degree is higher than a preset degree, selecting order picking positions in a same workstation for the orders, wherein the workstation comprises a plurality of order picking positions, and a number of workstations is greater than 1; or
   comparing a first order for which the order picking position has not yet been determined, with other orders that are being processed at a workstation, determining the coincidence degree of the first order to the other orders being processed in the workstation, and if the coincidence degree is higher than a preset degree, selecting the order picking position for the first order in the workstation.

3. The article picking method according to claim 1, wherein selecting one or more shelves from the candidate shelves further comprises:
   based on one or more articles carried by the candidate shelves, determining a set of shelf combinations required to accomplish the order to be picked;
   determining each of a total length of paths from shelves belonging to a same shelf combination to the order picking position; and
   determining a shelf combination with the least total path length from the set of shelf combinations to perform article picking for the order to be picked for.

4. The article picking method according to claim 1, wherein selecting one or more shelves from the candidate shelves further comprises:
   determining a handling cost of each candidate shelf based on at least two of: a number of each kind of article required by a workstation, an inventory of each kind of article on the shelf, a distance from the shelf to the workstation, or a position of a target article on the shelf,
   wherein, the workstation comprises a plurality of order picking positions, and wherein the handling cost is:
   higher when the number of each kind of the articles required by the workstation is larger,
   lower when an inventory of a corresponding article on the shelf is larger, and
   higher when a distance from the location of the candidate shelf to the workstation is longer; and
   selecting the one or more shelves, from the candidate shelves, with the lowest handling cost to perform article picking for each order of the workstation.

5. The article picking method according to claim 1, wherein the driving one or more selected shelves to the order picking position further comprises,
   if a selected shelf is not being carried by a shelf handling cart:
   selecting a shelf handling cart to carry the selected shelf based on a distance of the selected shelf to a location of each of the available shelf handling carts;
   planning a route for the selected shelf handling cart to the selected shelf, and planning a route to carry the selected shelf to the order picking position;
   driving the selected shelf handling cart to a position of the selected shelf; and
   carrying the selected shelf to the order picking position.

6. The article picking method according to claim 1, wherein the driving one or more selected shelves to the order picking position further comprises,
   if the selected shelf is being carried by a shelf handling cart:
   planning a route from a current position of the shelf handling cart carrying the selected shelf to the order picking position; and
   driving the cart to the order picking position along the route from the current position to the order picking position.

7. The article picking method of claim 1, further comprising:
   displaying each of the articles carried on the selected one or more shelves that conform to the articles required by one or more of the orders.

8. An article picking server comprising:
   a memory; and
   a processor coupled to the memory, which is configured to, based on instructions stored in the memory:

determine an order picking position for an order to be picked based on one or more articles required in the order, the determine the order picking position comprising:
  determining each of the articles required in the order to be picked, and
  determining the order picking position for the order to be picked based on a coincidence degree of the articles required between the order to be picked and other orders,
  wherein the coincidence degree is a ratio of a number of kinds of coincidence articles between the order to be picked and other orders, to kinds of articles required by the order to be picked;
the processor is further configured to select one or more shelves from candidate shelves, the one or more selected shelves each carry at least one of the articles that are required by the order to be picked,
  wherein the one or more shelves are selected based on: one or more articles on each of the shelves, and distances from each of the candidate shelves to the order picking position,
  the candidate shelves consisting of: shelves residing at order picking positions for picking one or more articles, shelves returning from order picking positions to predetermined positions, and shelves residing at the predetermined positions; and
the processor is further configured to cause the one or more selected shelves to be driven to the order picking position to perform article picking.

9. The article picking server according to claim 8, wherein determining the order picking position for the order to be picked based on the coincidence degree further comprises at least one of the following:
  comparing orders for which the order picking position has not been determined, and determining the coincidence degree between those orders and the order to be picked; wherein if the coincidence degree is higher than a preset degree, selecting order picking positions in a same workstation for the orders, wherein the workstation comprises a plurality of order picking positions, and a number of workstations is greater than 1; or
  comparing a first order for which the order picking position has not yet been determined, with other orders that are being processing at a workstation, determining the coincidence degree of the first order to the other orders being processed in the workstation, and if the coincidence degree is higher than a preset degree, selecting the order picking position for the first order in the workstation.

10. The article picking server according to claim 8, wherein selecting one or more shelves from the candidate shelves further comprises:
  based on one or more articles carried by the candidate shelves, determining a set of shelf combinations required to accomplish the order to be picked;
  determining each of a total length of paths from shelves belonging to a same shelf combination to the order picking position; and
  determining a shelf combination with the least total path length from the set of shelf combinations to perform article picking for the order to be picked.

11. The article picking server according to claim 8, wherein selecting one or more shelves from candidate shelves further comprises:
  determining a handling cost of each candidate shelf based on at least two of:
    a number of each kind of article required by a workstation,
    an inventory of each kind of article on the shelf,
    a distance from the shelf to the workstation, or
    a position of a target article on the shelf,
    wherein, the workstation comprises a plurality of order picking positions, and
    wherein the handling cost is:
      higher when the number of each kind of the articles required by the workstation is larger,
      lower when an inventory of a corresponding article on the shelf is larger, and
      higher when a distance from the location of the candidate shelf to the workstation is longer; and
  selecting the one or more shelves, from the candidate shelves, with the lowest handling cost to perform article picking for each order of the workstation.

12. The article picking server according to claim 8, wherein driving the one or more selected shelves to the order picking position further comprises,
  if a selected shelf is not being carried by a shelf handling cart:
    selecting a shelf handling cart to carry the selected shelf based on a distance of the selected shelf to a location of each of the available shelf handling carts;
    planning a route for the selected shelf handling cart to the selected shelf, and planning a route to carry the selected shelf to the order picking position;
    driving the selected shelf handling cart to a position of the selected shelf; and
    carrying the selected shelf to the order picking position; and
  if the selected shelf is being carried by a shelf handling cart:
    planning a route from a current position of the shelf handling cart carrying the selected shelf to the order picking position; and
    driving the cart to the order picking position along the route from the current position to the order picking position.

13. The article picking server of claim 8, further comprising:
  displaying each of the articles carried on the selected one or more shelves that conform to the articles required by one or more of the orders.

14. A non-transitory computer-readable storage medium having stored thereon computer program instructions that, when executed by a processor, implement an article picking method, comprising:
  determining an order picking position for an order to be picked based on one or more articles required in the order, the determining the order picking position comprising:
    determining each of the articles required in the order to be picked, and
    determining the order picking position for the order to be picked based on a coincidence degree of the articles required between the order to be picked and other orders,
    wherein the coincidence degree is a ratio of a number of kinds of coincidence articles between the order to be picked and other orders, to kinds of articles required by the order to be picked;
  selecting one or more shelves from candidate shelves, the one or more selected shelves each carry at least one of the articles that are required by the order to be picked, wherein the one or more shelves are selected based on:

one or more articles on each of the shelves, and distances from each of the candidate shelves to the order picking position, the candidate shelves consisting of:

shelves residing at order picking positions for picking one or more articles, shelves returning from order picking positions to predetermined positions, and shelves residing at the predetermined positions; and driving the one or more selected shelves to the order picking position to perform article picking.

15. An article picking system comprising:

an article picking server comprising:

a memory; and a processor coupled to the memory, which is configured to, based on instructions stored in the memory:

determine an order picking position for an order to be picked based on one or more articles required in the order, the determine the order picking position comprising:

determining each of the articles required in the order to be picked, and determining the order picking position for the order to be picked based on a coincidence degree of the articles required between the order to be picked and other orders, wherein the coincidence degree is a ratio of a number of kinds of coincidence articles between the order to be picked and other orders, to kinds of articles required by the order to be picked;

the processor is further configured to select one or more shelves from candidate shelves, the one or more selected shelves each carry at least one of the articles that are required by the order to be picked, wherein the one or more shelves are selected based on: one or more articles on each of the shelves, and distances from each of the candidate shelves to the order picking position, the candidate shelves consisting of: shelves residing at order picking positions for picking one or more articles, shelves returning from order picking positions to predetermined positions, and shelves residing at the predetermined positions; and the processor is further configured to cause the one or more selected shelves to be driven to the order picking position to perform article picking; and one or more shelves, configured to carry one or more articles, and be driven by the article picking server to respective order picking positions so as to perform article picking.

16. The article picking system according to claim 15, further comprising:

one or more shelf handling carts, configured to be driven by the article picking server to carry the shelves to the order picking position.

17. The article picking system according to claim 15, further comprising:

one or more display devices located on the shelves or at order picking positions, the one or more display devices are each configured to display each of the articles carried on the selected shelf which conforms to the articles required by one or more of the orders belonging to the order picking position, based on prompted information from the article picking server, when the selected shelf reaches the order picking position.

\* \* \* \* \*